United States Patent
Weiss (10) Patent No.: US 10,481,887 B2
(45) Date of Patent: Nov. 19, 2019

(54) METHOD AND SYSTEM FOR INSTALLING AN APPLICATION IN A SECURITY ELEMENT

(71) Applicant: GIESECKE & DEVRIENT GMBH, Munich (DE)

(72) Inventor: Dieter Weiss, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 144 days.

(21) Appl. No.: 14/442,927

(22) PCT Filed: Nov. 20, 2013

(86) PCT No.: PCT/EP2013/003501
§ 371 (c)(1),
(2) Date: May 14, 2015

(87) PCT Pub. No.: WO2014/079564
PCT Pub. Date: May 30, 2014

(65) Prior Publication Data
US 2015/0286473 A1    Oct. 8, 2015

(30) Foreign Application Priority Data
Nov. 22, 2012    (DE) .......................... 10 2012 022 875

(51) Int. Cl.
*G06F 9/44*    (2018.01)
*G06F 9/445*    (2018.01)
(Continued)

(52) U.S. Cl.
CPC ..................... *G06F 8/61* (2013.01)

(58) Field of Classification Search
CPC .............. G06F 8/61–71; G06Q 20/3552–3558
See application file for complete search history.

(56) References Cited

U.S. PATENT DOCUMENTS 5,923,884 A * 7/1999 Peyret ................... G06Q 20/341
    235/382
6,005,942 A * 12/1999 Chan ....................... G06F 21/51
    235/379
(Continued)

FOREIGN PATENT DOCUMENTS

| EP | 1536654 A2 | 6/2005 |
| EP | 1703382 A1 | 9/2006 |
| EP | 2333700 A2 | 6/2011 |

OTHER PUBLICATIONS

Michael Roland, Practical Attack Scenarios on Secure Element-enabled Mobile Devices, 2012, pp. 19-24. https://ieeexplore.ieee.org/stamp/stamp.jsp?tp=&arnumber=6176329 (Year: 2012).*

(Continued)

*Primary Examiner* — Mongbao Nguyen
(74) *Attorney, Agent, or Firm* — Workman Nydegger (57) ABSTRACT

A method for installing an application in a security element of a portable end device comprises the following steps: the installation device receives an installation job for installing a pre-specified application on a pre-specified security element. The job is processed by the installation device which receives the installation job from the pre-specified security element itself or from a further security element different from the pre-specified security element.

5 Claims, 2 Drawing Sheets

(51) Int. Cl.
*G06F 9/45* (2006.01)
*G06F 8/61* (2018.01)

(56) References Cited

U.S. PATENT DOCUMENTS

| | | | | |
|---|---|---|---|---|
| 6,317,832 B1* | 11/2001 | Everett | G06F 21/51 | 713/172 |
| 6,481,632 B2* | 11/2002 | Wentker | G06F 8/60 | 235/376 |
| 7,953,833 B2* | 5/2011 | Ben-Shaul | G06F 9/4416 | 709/220 |
| 8,196,131 B1* | 6/2012 | von Behren | G06Q 20/367 | 705/64 |
| 8,225,281 B1* | 7/2012 | Hardinger | G06F 11/3664 | 717/120 |
| 8,255,687 B1* | 8/2012 | Pelly | H04L 9/083 | 713/164 |
| 8,612,773 B2* | 12/2013 | Nataraj | G06F 8/60 | 713/161 |
| 8,625,800 B2* | 1/2014 | Jooste | H04L 9/0822 | 380/277 |
| 8,910,145 B2* | 12/2014 | Baraldi | G06F 8/62 | 717/155 |
| 8,996,065 B2* | 3/2015 | Baietto | H04L 67/34 | 455/558 |
| 9,301,145 B2* | 3/2016 | Merrien | H04W 4/70 | |
| 9,489,496 B2* | 11/2016 | Wysocki | G06F 21/10 | |
| 9,753,747 B2* | 9/2017 | Offenhartz | G06F 8/38 | |
| 2002/0174071 A1* | 11/2002 | Boudou | G06F 9/44526 | 705/41 |
| 2005/0132060 A1* | 6/2005 | Mo | H04L 51/12 | 709/227 |
| 2005/0177853 A1* | 8/2005 | Williams | H04N 21/2181 | 725/81 |
| 2007/0028120 A1* | 2/2007 | Wysocki | G06F 21/10 | 713/192 |
| 2007/0095927 A1* | 5/2007 | Pesonen | G07F 7/1008 | 235/492 |
| 2007/0282951 A1* | 12/2007 | Selimis | H04L 67/06 | 709/205 |
| 2008/0022380 A1* | 1/2008 | Lu | G06F 8/65 | 726/9 |
| 2008/0046574 A1* | 2/2008 | Kinoshita | H04L 67/2861 | 709/228 |
| 2008/0052770 A1* | 2/2008 | Ali | G06F 21/34 | 726/9 |
| 2008/0289018 A1* | 11/2008 | Kawaguchi | G06F 21/62 | 726/9 |
| 2008/0301233 A1* | 12/2008 | Choi | H04W 76/10 | 709/205 |
| 2009/0198805 A1* | 8/2009 | Ben-Shaul | G06F 9/4416 | 709/222 |
| 2009/0287917 A1* | 11/2009 | Carpenter | G06F 21/10 | 713/2 |
| 2009/0312011 A1* | 12/2009 | Huomo | G06K 7/0008 | 455/426.1 |
| 2010/0205432 A1 | 8/2010 | Corda et al. | | |
| 2010/0291896 A1 | 11/2010 | Corda | | |
| 2010/0306076 A1* | 12/2010 | Taveau | G06Q 20/02 | 705/26.8 |
| 2011/0072425 A1* | 3/2011 | Lemonnier | G06Q 20/32 | 717/178 |
| 2011/0113473 A1* | 5/2011 | Corda | G06Q 20/32 | 726/3 |
| 2011/0119371 A1* | 5/2011 | Toshima | G06F 21/552 | 709/224 |
| 2011/0131421 A1* | 6/2011 | Jogand-Coulomb | G06F 8/61 | 713/189 |
| 2011/0296182 A1* | 12/2011 | Jia | G06Q 20/32 | 713/168 |
| 2012/0159148 A1* | 6/2012 | Behren | G06Q 20/3552 | 713/150 |
| 2012/0159195 A1* | 6/2012 | von Behren | G06Q 20/3552 | 713/193 |
| 2012/0190354 A1* | 7/2012 | Merrien | H04W 4/70 | 455/422.1 |
| 2012/0233456 A1* | 9/2012 | Spitz | G06F 21/34 | 713/155 |
| 2013/0122864 A1* | 5/2013 | Haggerty | H04L 63/105 | 455/411 |
| 2013/0223623 A1* | 8/2013 | Jooste | H04L 9/0822 | 380/44 |
| 2014/0082056 A1* | 3/2014 | Gargiulo | H04L 9/00 | 709/203 |
| 2014/0298322 A1* | 10/2014 | Gargiulo | G06F 8/61 | 717/175 |
| 2015/0326565 A1* | 11/2015 | Kuang | G06F 21/34 | 726/4 |
| 2016/0054989 A1* | 2/2016 | Diebolt | G06F 8/61 | 717/177 |

OTHER PUBLICATIONS

Vincent Alimi, Post-distribution provisioning and personalization of a payment application on a UICC-based Secure Element, 2009, pp. 702-705. https://ieeexplore.ieee.org/stamp/stamp.jsp?tp=&arnumber=5066550 (Year: 2009).*

B. Benyó, Security issues of service installation on a multi application NFC environment, 2010, pp. 145-149. https://ieeexplore.ieee.org/stamp/stamp.jsp?tp=&arnumber=5483857 (Year: 2010).*

Gerald Madlmayr, Managing an NFC Ecosystem, 2008, pp. 95-100. https://ieeexplore.ieee.org/stamp/stamp.jsp?tp=&arnumber=4570168 (Year: 2008).*

Vincent Alimi, Post-distribution provisioning and personalization of a payment application on a UICC-based Secure 2009, pp. 701-705. https://ieeexplore.ieee.org/stamp/stamp.jsp?tp=&arnumber=5066550 (Year: 2009).*

Defan Long, Mechanism for generic purpose SIM card communication and its applications, 2012, pp. 1-4. https://ieeexplore.ieee.org/stamp/stamp.jsp?tp=&arnumber=6197879 (Year: 2012).*

William Marshall, Carrier VoIP Security Architecture, 2006, pp. 1-6. https://ieeexplore.ieee.org/stamp/stamp.jsp?tp=&arnumber=4082419 (Year: 2006).*

Teddy Mantoro, Smart Card Authentication for Internet Applications using NFC Enabled Phone, 2010, pp. 1-6. https://ieeexplore.ieee.org/stamp/stamp.jsp?tp=&arnumber=5971895 (Year: 2010).*

Akram et al., "Application Management Framework in User Centric Smart Card Ownership Model," Information Security Applications, Aug. 25, 2009, pp. 20-35.

German Search Report for corresponding German Application No. 102012022875.9, dated Oct. 24, 2013.

"GlobalPlatform Card Specification, Version 2.2.1, Public Release," GlobalPlatform The Standard for Managing Applications on Secure Chip Technology, Jan. 1, 2011, Document Reference: GPC_SPE_034, pp. 1-303, URL: http://www.globalplatform.org.

International Search Report for corresponding International PCT Application No. PCT/EP2013/003501, dated Feb. 21, 2014.

* cited by examiner

FIG 3

METHOD AND SYSTEM FOR INSTALLING AN APPLICATION IN A SECURITY ELEMENT

BACKGROUND

The present invention relates to a method for installing an application in a security element of a portable end device, to a corresponding installation device, to a corresponding security element, and to a system comprising at least one installation device and at least one end device having at least one security element.

The functionality of portable end devices, such as for example mobile radio end devices, smartphones, tablets and the like, can be extended in the known manner by the installation of software functionalities, so-called applets or "apps". Various of these applets serve applications that also comprise and/or process security-relevant data. Security-relevant data can be for example confidential personal data of a user of the end device, such as for example biometric data, or data that are employed for performing financial transactions, such as for example credit card number, account data, content of electronic purses, cryptographic keys, etc.

It is known to protect applications, in particular those that process security-relevant data, from tampering and unauthorized access by said applications being stored or installed and executed in a specially secured region of the end device.

Suitable secure regions are in particular security elements that are integratable into an end device or firmly incorporated therein. Removably integratable security elements are for example SIM/UICC mobile radio cards, secure multimedia cards, or the like. As security elements firmly incorporated into the end device there can be used for example embedded SIM/UICC mobile radio cards, TPMs ("Trusted Platform Modules") or NFC modules. Finally, security elements that can also be used are secure runtime environments within a specific hardware architecture of the end device, for example within an ARM TrustZone architecture, such as for example a Trusted Execution Environment according to the Global Platform specification.

It is to be noted that a security element of the above-described kind can comprise a plurality of secure regions. That is to say, for example a SIM card as a physical security element can comprise a plurality of secure regions in a memory of the card. In particular, said secure regions can be present as so-called Security Domains according to the Global Platform specification (cf. e.g. Global Platform, Card Specification, Version 2.2). Such a Security Domain is normally associated with a pre-specified external entity, for example the issuer of the data carrier, a network operator, an application provider, or the like. Said entity will then also be designated hereinafter the "owner" of the Security Domain. Analogously, an "owner" of a security element will also be spoken hereinafter when designating that entity with which the security element is associated. The owner of the security element is in particular responsible for the key architecture of the security element. Security Domains can be present on a physical security element in a hierarchically disposed manner, with an owner of a privileged Security Domain being able to create further, hierarchically dependent Security Domains for possible other owners, along with the appurtenant key architecture.

The installing of applications in a security element is normally secured cryptographically. Increasingly, such an installation particularly of security-relevant applications in a security element of a portable end device is carried out using trustworthy installation devices, so-called trusted service managers (hereinafter designated TSMs). Such a device, as a service provider, accepts the application to be installed and carries out the installation process, i.e. the secure installing of the application in the security element, autonomously. Hereinafter the formulation that the TSM "manages" the security element will be used in this connection. Before the installing step, cryptographic keys are normally exchanged between the TSM and the institution supplying the application, for example a bank in the case of a payment application to be personalized, and incorporated into the security element in a secure manner. By means of said keys the installation process can be secured cryptographically.

In practice, the described procedure and the described system have partly turned out to be disadvantageous. This is firstly due to the fact that a multiplicity of installation devices, in particular TSMs, have appeared on the market. It is hence becoming increasingly difficult for an application provider to ascertain that TSM that is managing a pre-specified security element in a particular case. Further, installation jobs increasingly fail because different manufacturers and/or issuers of security elements partly provide proprietary communication protocols for communication with the corresponding security elements, which are then unknown to individual installation devices. Finally, the conventional system is rigid and does not allow security elements to influence the installation process.

SUMMARY

The object of the present invention is to propose a method and a system that take the hereinabove mentioned disadvantages into account and allow the installing of an application in a security element of an end device in a flexible and variable manner.

This object is achieved by a method, a security element, an installation device and a system having the features of the independent claims. Advantageous embodiments and developments are stated in the dependent claims.

A method according to the invention for installing an application in a security element of a portable end device comprises the following steps: The installation device receives an installation job for installing a pre-specified application on a pre-specified security element. Said job is processed by the installation device in the manner described hereinafter. According to the invention, the installation device receives the installation job from the pre-specified security element itself or from a further security element different from the pre-specified security element. The further security element can be a security element that is disposed on the same end device as the pre-specified security element, or else on a further end device.

Accordingly, an installation device according to the invention for installing an application on a security element of a portable end device comprises an installation job accepting device for accepting an installation job for installing a pre-specified application on a pre-specified security element, a device for carrying out or initiating an installation of an application on a security element, and an installation processing device which is arranged to process an accepted installation job. According to the invention, the installation job accepting device is arranged to also accept an installation job from a security element.

Finally, a security element according to the invention for a portable end device comprises an accepting device for receiving an application to be installed on the security element from an installation device. Further, the security element comprises according to the invention an installation job submitting device which is arranged to direct an installation job for installing an application on the security element itself or on a further security element different from said security element to an installation device.

In this manner, an installation process according to the prior art can be extended to the effect that a security element itself can also act as the job originator of an installation process. Hitherto this role was reserved for other entities, in particular a manufacturer or issuer of the security element or a third party that is commissioned by such an entity and thus indirectly authorized, such as for example an application provider.

The installation job can firstly relate to an installation of an application on the security element submitting the job, itself. For this purpose, an application provider not knowing a TSM managing the security element can for example transfer an application to be installed on the security element directly to the security element, which then, knowing the managing TSM, directs the corresponding installation job to the TSM. Further, a security element can for example submit to an installation device suitable therefor a job for installation of an application, which is hitherto present on the security element only in the form of interpretable program code, in the form of machine code tailored to the security element.

An installation job directed by a security element to an installation device can, however, also relate to the installation of a pre-specified application in a further security element different from said security element. Alternatively, the job can also relate to a security element on another end device, for example in order to produce a copy of the security element, ordered by the security element.

Diverse, further scenarios are imaginable in which the procedure according to the invention for submitting an installation job to an installation device on the initiative of the security element can be used advantageously.

According to a preferred embodiment, the installation job submitting device of the security element comprises a first and a second job submitting device.

The first job submitting device is arranged to direct an installation job to the installation device according to a first, preferably Internet-based communication protocol. The first communication protocol can correspond for example to a protocol according to which a job originator, for example a manufacturer or issuer of a security element, has hitherto directed an installation job to a conventional installation device. Accordingly, a security element according to the invention can according to this embodiment now also direct an installation job to installation devices that have not yet been extended according to the invention. In other words, the first communication protocol normally represents a standard interface between an installation device and an originator of an installation job.

The second job submitting device of the security element, on the other hand, is arranged to direct an installation job to an accordingly arranged installation device according to a second communication protocol different from the first communication protocol. The second communication protocol is preferably configured as a chip card communication protocol. This protocol can in particular also be configured to be proprietary.

The second communication protocol can be advantageously used when the installation job is to be directed to an installation device according to a corresponding, advantageous embodiment of the invention.

The installation job accepting device of such an installation device comprises a first and a second job accepting device. The first job accepting device is arranged to accept installation jobs according to the first, preferably Internet-based communication protocol. Accordingly, the installation device can, as indicated, accept installation jobs in the conventional manner unchanged, not only from a security element but also from those entities conventionally acting as job originators.

The second job accepting device, on the other hand, is arranged to accept installation jobs according to a second communication protocol, with the second communication protocol preferably being configured as a chip card communication protocol. Said second communication protocol can now advantageously correspond to the second communication protocol which is supported by a security element according to the invention. In this manner, the installation device can be adapted to accept installation jobs of accordingly arranged security elements via a chip card communication protocol in a manner adapted to the security element.

A security element whose installation job submitting device comprises both the first and the second job submitting device can thus address a conventional installation device or one extended according to the invention with an installation job as a "conventional" job originator, via the first communication protocol, or else address an installation device extended according to the invention, explicitly in the role of a security element, via the second communication protocol.

It will be appreciated that an installation job submitting device of a security element can also merely comprise only the first job submitting device or only the second job submitting device.

Analogously, an installation job accepting device of an installation device can also merely comprise only the first or only the second job accepting device.

According to a further preferred embodiment of the method according to the invention, the installation device interacts with a further installation device in the step of processing the installation job.

According to the prior art, only one installation device was involved in a respective installation process of the underlying kind. This is disadvantageous especially when said one installation device cannot carry out the installation process alone for a certain reason. Such reasons may be for example that the installation device does not support the possibly proprietary communication protocol employed for data communication by the security element, that the installation device does not have the cryptographic keys necessary for installation, or that the installation device does not have compiler and/or linker functionalities that are necessary for generating an application adapted to the security element according to the installation job, in machine code. Diverse further reasons are conceivable. By means of a targeted interaction of different installation devices within the context of an installation process, many of these difficulties can be remedied.

According to a first variant, the installation device can relay the installation job to the further installation device in the processing step. For this purpose, the processing device comprises a relaying device which is arranged to relay an accepted installation job to the further installation device. This is always expedient when it can be assumed that the further installation device is arranged and able to execute the installation job, i.e. to install the pre-specified application in the pre-specified security element.

According to a preferred embodiment of this variant, the relaying device also supports the hereinabove mentioned first and second communication protocols which can be employed by a security element according to the invention for directing an installation job to an installation device. In this manner, the relaying device can transmit the job in an unchanged form. In particular when the security element addresses the installation device "as a security element", i.e. according to the second communication protocol, the relaying device should relay the job to the further installation device in the corresponding manner in the role of a security element, i.e. according to the second communication protocol. In this manner it can be guaranteed that installation jobs received via the first and second communication protocols are processed differently, where applicable, for example with respect to a priority in a processing sequence, or the like.

According to a second variant, the installation device can, in the processing step, for example request from the further installation device an installation authorization for carrying out the installation job, for example in the form of cryptographic keys necessary for installation. For this purpose, the processing device comprises an installation authorization requesting device. Said device is arranged to request an installation authorization from the further installation device for carrying out the accepted installation job. In reply to this request, the further installation device can for example supply the requesting installation device with the relevant keys. Alternatively and preferably, the further installation device can, for example in the role of the owner of a privileged Security Domain, set up a derived Security Domain for the requesting installation device and transmit the appurtenant cryptographic keys. The requesting installation device thereby obtains an installation authorization for installing the pre-specified application in the Security Domain specially set up therefor.

According to a third variant, the installation device can request compiler/linker functionalities from the further installation device for generating an application tailored to the security element, in machine code. Alternatively, the further installation device could also generate the application in machine code, on the basis of information requested from the security element or supplied by the security element, in particular with regard to the hardware and software configuration of the security element, and supply it to the installation device for installation.

Normally, the installation device will check a received installation job before the processing step as to whether it can execute the job without interacting with a further installation device, or not. Should the latter be the case, the installation device determines by means of a determining device a further installation device suitable for interaction upon processing. For this purpose, the determining device can make use of information stored in the security element and explained hereinafter. Alternatively, there can be provided in the system a central place which can be accessed by installation devices connected to the system, and which comprises corresponding determination information.

As already indicated, within the context of the method a further installation job can also be received by the installation device in the "conventional" manner, i.e. from a manufacturer of the security element or an issuer of the security element or an authorized third party. Such a job can also be processed with interaction of different installation devices, as described hereinabove.

Each installation device according to the invention comprises, as mentioned, a device for carrying out or initiating an installation of an application on a security element. In other words, each installation method according to the invention is terminated by the pre-specified application being installed in the pre-specified security element or being transferred to the security element in a form so as to be installable by the security element itself. Different installation devices can comprise mutually divergent devices for carrying out or initiating an installation. In particular, individual ones of said devices can be adapted to certain security elements in a special way, for example with regard to a possibly proprietary communication protocol respectively pre-specified for data communication by the respective security elements.

A security element according to the invention can comprise a determination table. Said table states which installation device can carry out an installation of a pre-specified application on the security element. Further, the table states with which further installation device the first installation device can interact to effectuate an installation of a pre-specified application on the security element. Using the determination table, the security element can determine an installation device to which an installation job is directed. Part of the installation job can be the information about a further installation device suitable for interaction.

Further, a hereinabove described determining device of an installation device can access the determination table of the security element within the context of an installation method in order to determine a further installation device for interaction. Corresponding information can alternatively or additionally, as mentioned, also be stored in a central database or the like, which is accessible to all installation devices appurtenant to the system according to the invention.

BRIEF DESCRIPTION OF THE DRAWINGS

The present invention will be described hereinafter by way of example with reference to the attached drawings. Therein are shown.

DETAILED DESCRIPTION OF VARIOUS EMBODIMENTS

Figure 1:
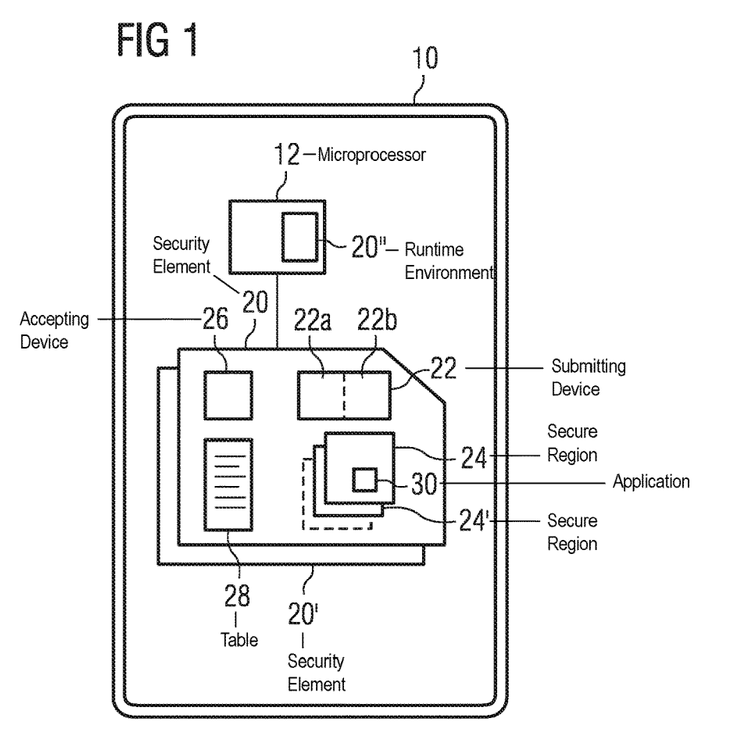
FIG. 1 an end device having a plurality of security elements according to a preferred embodiment of the invention.

FIG. 1 shows an end device 10 in the form of a smartphone. The end device 10 is arranged in the known manner to be connected (cf. FIG. 3), for example via a mobile radio network, with an installation device TSM1, TSM2, TSM3 and/or a further entity, for example an application provider 300, for example via the Internet. The end device 10 can alternatively for example also be configured as a mobile radio end device, as a tablet computer, as an Ultrabook or netbook, as a notebook, or the like.

The end device 10 comprises a microprocessor 12 which controls the end device 10. Various data communication interfaces of the end device 10 are not represented in detail.

The end device 10 can comprise one or more security elements 20, 20', 20". Connected to the microprocessor 12 is a security element 20, which is indicated as a SIM card in the shown example. The security element 20 is integrated removably into the end device 10. Alternatively or additionally, a security element 20' could for example also be present as a secure memory card or the like. Alternatively or additionally to a removably integrated security element 20, the end device 10 could also be equipped with a firmly incorporated security element (not shown), for example an embedded SIM/UICC mobile radio card, a TPM, an NFC module, or the like. Finally, a secure runtime environment 20" within a specific hardware architecture of the end device 10, for example as a Trusted Execution Environment according to the Global Platform specification, could also serve as a security element 20". Such a secure runtime environment 20" is supplied on the processor 12 of the end device 10 alongside the normal runtime environment.

A security element 20 can comprise one or more secure regions 24. Secure regions 24 can be Security Domains according to the Global Platform specification, as described hereinabove. Each security element 20 has associated therewith a TSM which manages said security element 20 or at least a secure region 24 of the security element 20. The secure regions 24 are in principle suitable for installing an application 30 therein in the manner described hereinafter with reference to FIG. 3.

The end device 10 can, as mentioned, comprise a plurality of security elements 20, 20', 20". Each security element 20, 20', 20" can moreover for its part comprise a plurality of secure regions 24. Different security elements 20, 20', 20" can have different TSMs associated therewith. Likewise, different secure regions 24, 24' can have different TSMs associated therewith. In the security element 20 a determination table 28 is hence stored. Said table states which TSM can carry out an installation of a pre-specified application on which security element 20 or on which secure region 24 of which security element 20. Further, the table 28 states with which further TSM a stated TSM can interact to effectuate an installation of a pre-specified application 30 on the security element 20 or the secure region 24.

Further, the security element 20 comprises an accepting device 26 for receiving an application 30 to be installed on the security element 20 from an installation device 100, for example a TSM. The accepting device 26 can be arranged to carry out remaining steps for installing a received application 30 prepared for installation.

The security element 20 further comprises an installation job submitting device 22. Said device is arranged to direct an installation job for installing an application on the security element 20 or on a further security element 20', 20", 20''' different from the security element 20 (cf. FIG. 3) to an installation device, for example a TSM (cf. FIG. 3).

The installation job submitting device 22 comprises a first job submitting device 22a. Said device is arranged to direct an installation job to an installation device 100 according to a first, Internet-based communication protocol, for example via TCP/IP. A second job submitting device 22b of the installation job submitting device 22 is arranged to direct an installation job to the installation device 100 according to a second communication protocol. The second communication protocol is configured as a chip card communication protocol, for example, T=0 or T=1. Proprietary protocols can also be employed here.

The functionalities of the installation job submitting device 22, of the accepting device 26 and of the determination table 28 can be available to the secure regions 24 of the security element 20 in the same manner. Alternatively, individual ones or all of the secure regions 24 can respectively have corresponding functionalities of their own.

Figure 2:
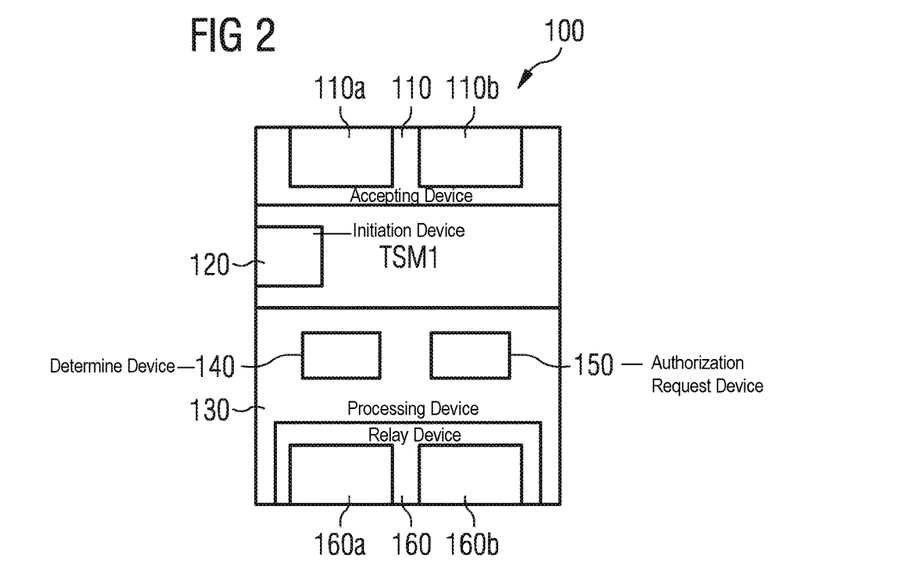
FIG. 2 a preferred embodiment of an installation device according to the invention, and FIG. 3 different components of a preferred embodiment of a system according to the invention within the context of two preferred embodiments of a method according to the invention.

FIG. 2 represents an installation device 100 as a TSM by way of example. Said device comprises an installation job accepting device 110 for accepting an installation job for installing a pre-specified application 30 on a pre-specified security element 20, a device 120 for carrying out or initiating an installation of an application 30 on a security element 20, and an installation processing device 130 which is arranged to process an accepted installation job.

The installation job accepting device 110 comprises a first job accepting device 110a which is arranged to accept installation jobs according to a first, preferably Internet-based communication protocol, for example via TCP/IP. By such means, installation jobs can be accepted in the conventional manner, for example from an application provider 300 or a manufacturer/issuer 300' of a security element 20. In the same manner, this interface 110a can now also serve for receiving installation jobs of a security element 20 which are submitted via the first job submitting device 22a of the security element 20.

A second job accepting device 110b is arranged to accept installation jobs according to a second communication protocol, for example according to T=0 or T=1 or a corresponding proprietary protocol. The second communication protocol corresponds to a second communication protocol supported by a certain type of security elements 20 or their second job submitting device 22b.

The installation processing device 130 is arranged to check a received installation job as to whether said job can be executed by the installation device 100 without interaction with a further installation device 100', 100". Within the context of such a check, the processing device 130 checks for example whether a possibly proprietary communication protocol supported by the security element 20 is known, whether an installation authorization is quite generally present, in particular necessary cryptographic keys, and so forth.

If the check turns out positive, the installation job is transmitted for further execution to the device 120, which carries out or initiates the installation of the application.

However, if the processing device 130 recognizes within the context of the check that an interaction with a further installation device 100', 100" is necessary for carrying out the installation job, the processing device 130 ascertains by means of the determining device 140 a corresponding further installation device 100', 100" which is suitable for interacting with the installation device 100 in connection with the installation job.

The installation authorization requesting device 150, which is likewise part of the processing device 130, is arranged to request an installation authorization, in particular cryptographic keys necessary for installation, from the previously determined, further installation device 100', 100", for carrying out the accepted installation job.

In the case that the processing device 130, in combination with the determining device 140, reaches the conclusion within the context of checking the installation job that a further, certain installation device 100' is arranged and able to execute the installation job, the processing device 130 can relay the job to the further installation device 100' via the relaying device 160.

Preferably, the relaying device 160 also supports the two communication protocols via which the installation job accepting device 110 of the installation device 100 can accept installation jobs. In this manner, the relaying device 160 can transmit the job in unchanged form, by means of the first interface 160a or second interface 160b, i.e. in particular by means of the same protocol according to which the installation device 100 has received the installation job. It can hence remain transparent to the further installation device 100' that the job is not being received directly from a security element 20, but via the installation device 100. It is also possible, however, that the relaying device 160 changes the protocol upon relaying. That is to say, the relaying device 160 can for example relay an installation job received from the installation device 100 via the second chip card communication protocol to a further installation device via the first, Internet-based communication protocol—or vice versa.

Figure 3:
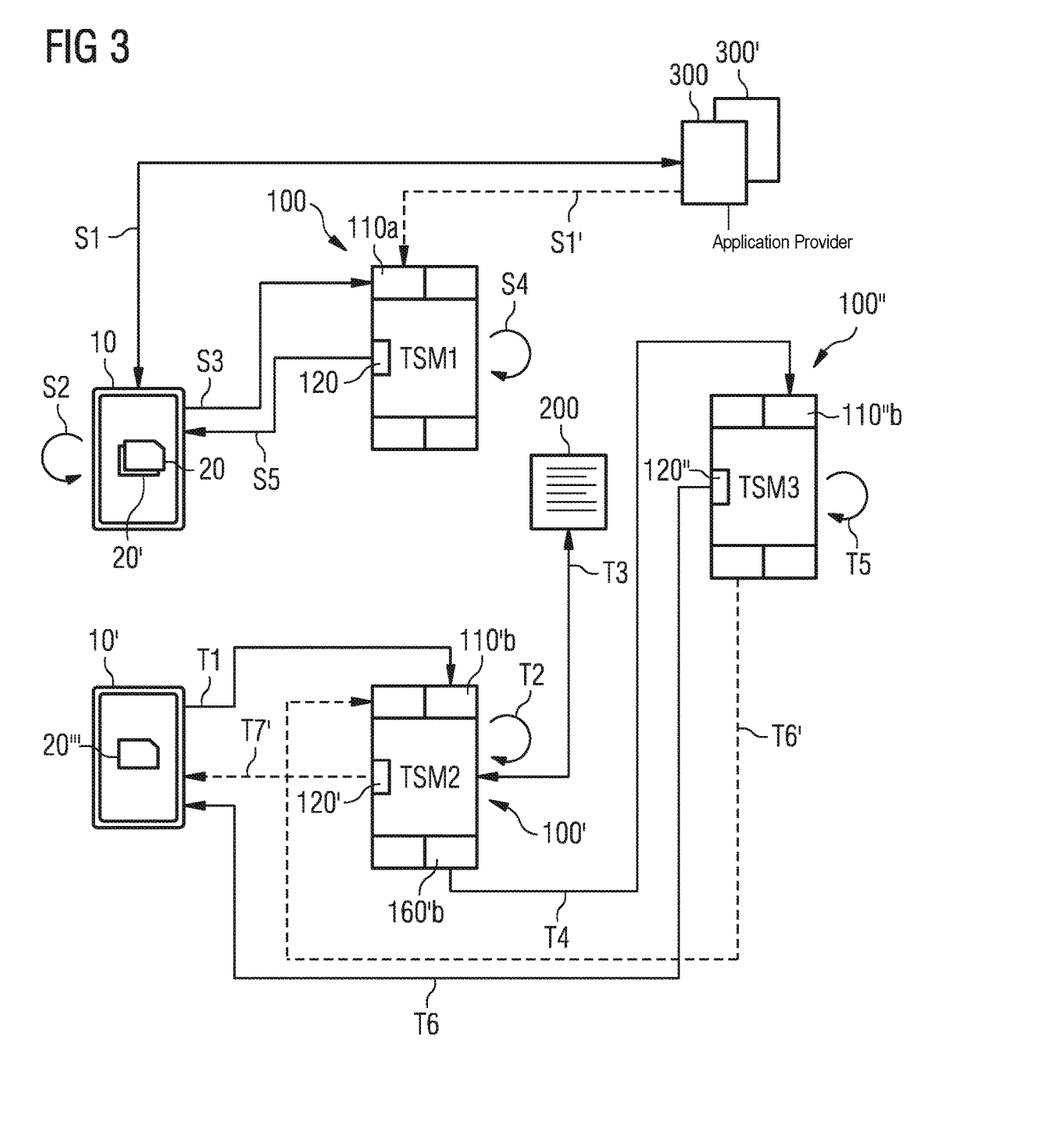

With reference to FIG. 3, individual steps of two preferred embodiments of a method for installing an application 30 in a security element 20 of a portable end device 10 are illustrated by way of example. The method is carried out here within a system having a plurality of installation devices TSM1, TSM2, TSM3 as well as a plurality of end devices 10, 10'. Each of said end devices comprises, as mentioned, at least one security element 20, 20', 20", 20'".

An optional central server 200 can comprise information about which installation device 100, 100', 100" is suitable alone or in interaction with which further installation device 100, 100', 100" for managing a pre-specified security element 20. The server 200 can normally be accessed by all installation devices 100, 100', 100" of the system.

Within the context of a first embodiment of the method, an application 30 which is supplied by an application provider 300 is to be installed on the security element 20 of the end device 10. In the conventional manner, the application provider 300 would for this purpose address the TSM1 100 (cf. step S1') and direct a corresponding installation job thereto via the first job accepting device 110a. However, if it is unknown to the application provider 300 which TSM 100 manages the security element 20, another path can alternatively be taken, according to the method according to the invention.

In step S1 the application provider 300 transfers the application 30 to the end device 10, in an uninstallable form and normally without installation authorization. The end device 10 comprises the security element 20 in which the application 30 is to be installed. The end device 10 relays the application 30 to the security element 20.

In step S2 the security element 20 determines on the basis of its determination table 28 that the installation device 100, i.e. the TSM1, is suitable for executing the installation of the application 30 in the security element 20.

In step S3 the security element 20 transmits a corresponding installation job by means of the first job submitting device 22a of the installation job submitting device 22 according to the first, Internet-based standard communication protocol to the TSM1. The job is received there via the first job accepting device 110a of the installation job accepting device 110. Due to the fact that the TSM1 has received the job via the standard job accepting interface 110a, said job appears to the TSM1 100 just like a corresponding job received from the application provider 300 in the conventional manner.

In step S4 the processing device 130 of the TSM1 100 checks the job and recognizes that no interaction with a further TSM 100', 100" is necessary for carrying out the same. The processing device 130 gives the installation job to the device 120, which finally carries out an installation of the application 30 in the security element 20 in step S5.

The installation job ordered by the security element 20 could also require that the application 30 be installed alternatively or additionally on the further security element 20', 20" of the end device 10 or even on a security element 20' of an end device 10' different from the end device 10.

With reference to the steps T1 to T6, a further embodiment of the method is illustrated.

Here, the security element 20', which is integrated into the end device 10', addresses the TSM2 in step T1 with the job of supplying an application 30, which is already present in the security element 20'" in the form of a program code interpretable by a virtual machine, in the form of machine code adapted to the security element 20'" and installing it in the security element 20'. The installation job additionally comprises for this purpose the necessary information with regard to the hardware and software configuration of the security element 20'. Alternatively, said information can be requested from the security element 20' after reception of the installation job by the installation device 100'. The security element 20' here directs the job to the second job accepting device 110'b of the TSM2 100' by means of the second job submitting device 22b according to a chip card communication protocol.

The processing device of the TSM2 100' checks the job in step T2, and determines in step T3 by an inquiry with the server 200 that the TSM3 100" comprises the necessary compiler and linker functionalities in order to generate a corresponding machine code for the application 30, adapted to the security element 20'.

Accordingly, in step T4 the TSM2 100' relays the installation job unchanged by means of the relaying interface 160'b to the TSM 3 100", which accepts the job via the second job accepting device 110"b.

A recheck of the job by the TSM3 100" in step T5 yields that the TSM3 100" can execute the job. The machine code is generated, and the adapted application 30 installed in the security element 20' by means of the device 120" in step T6.

Alternatively, the TSM3 100" could also have relayed the machine code to the TSM2 100', for example in the form of a modified installation job via the Internet-based first communication protocol, as indicated by dash lines with reference to step T6'. In this case the installation of the application 30 in machine code could have been carried out by the device 120' of the installation device 100', as likewise indicated by dash lines with step T7'.

The invention claimed is:

1. A method for installing an application in a security element of a portable end device, the security element comprising its own hardware-based secure runtime environment and a secure memory that are separate from the portable end device, the method comprising the steps of:

receiving an installation job at a first installation device for installing the application on the security element, the installation job being provided to the first installation device from the security element, wherein the security element receives the application from an application server that is separate from the first installation device;

checking at the first the received installation job to determine whether the received installation job can be executed by the first installation device without interaction with a second installation device;

wherein upon determining that the received installation job can be executed by the first installation device, processing the installation job by the first installation device;

wherein the first installation device receives the installation job from the security element or from a second security element different from the security element, and wherein upon determining that the received installation job cannot be executed by the first installation device without interaction with the second installation device, the first installation device interacts with the second installation device by relaying the installation job to the second installation device such that the application is installed on the security element by the second installation device to which the installation job was relayed, or by the first installation device requesting an installation authorization for carrying out the installation job from the second installation device, wherein the security element comprises a determination table which states when the first installation device can execute the installation job, and which states when the first installation device can interact with the second installation device to execute the installation job;

wherein the security element uses the determination table to determine which of the first and second installation devices are to be involved in the execution of the installation job;

wherein the first installation device can access the determination table of the security element in order to determine that the second installation device is suitable for interaction with the first installation device to execute the installation job; and wherein the first installation device and the second installation device are trusted service manager devices and the second installation device is separate from the first installation device.

2. The method according to claim 1, wherein the first installation device accepts the installation job according to a first Internet-based communication protocol, or that the first installation device accepts the installation job according to a second communication protocol different from the first communication protocol, with the second communication protocol being configured as a chip card communication protocol.

3. An installation device for installing an application on a security element of a portable end device, comprising:
one or more processors; and
one or more computer-readable media having thereon computer-executable instructions that are structured such that, when executed by the one or more processors, cause the installation device to:
accept an installation job for installing a pre-specified application on a pre-specified security element;
initiate an installation of the pre-specified application on a the pre-specified security element upon checking the installation job to determine whether the installation job can be executed by the installation device without interaction with a second installation device that is different from the installation device, the installation job being provided to the installation device from the pre-specified security element, wherein the pre-specified security element receives the pre-specified application from an application server that is separate from the installation device, and
process installation job upon determining that the installation job can be executed by the installation device, and
interact with the second installation device, upon determining that the installation job cannot be executed by the installation device without interaction with the second installation device, by replaying the installation job to the second installation device such that the pre-specified application is installed on the pre-specified security element by the second installation device to which the installation job was relayed or by the installation device requesting an installation authorization for carrying out the installation job from the second installation device, wherein the pre-specified element comprises a determine table which states when the installation device can execute the installation job, and which states when the installation device can interact with the second installation device to execute the installation job, wherein the pre-specified security element uses the determination table to determine which of the installation device and the second installation device are to be involved in the execution of the installation job;

wherein the installation device can access the determination table of the pre-specified security element in order to determine that the second installation device is suitable for interaction with the first installation device to execute the installation job; and wherein the installation device and the second installation device are trusted service manager devices and the second installation device is separate from the installation device.

4. The installation device according to claim 3, wherein the computer-executable instructions are structured, when executed, to further cause the installation device to:
accept installation jobs according to a first Internet-based communication protocol, or
accept installation jobs according to a second communication protocol different from the first communication protocol, with the second communication protocol preferably being configured as a chip card communication protocol.

5. A system for installing an application in a security element of a portable end device, the system comprising:
a first installation device;
a second installation device;
a portable end device including a security element; the security element configured to:
receive an application from an application server that is different from the first and second installation devices; and
provide an installation job for installing the application to the first installation device,
the security element comprising a determination table which states when the first installation device can execute the installation job, and which states when the first installation device can interact with the second installation device to execute the installation job, wherein the security element uses the determination table to determine which of the first and second installation devices are to be involved in the execution of the installation job;
the first installation device configured to:
receive the installation job from the security element;
check the installation job to determine whether the installation job can be executed by the first installation device without interaction with the second installation device, wherein the first installation device can access the determination table of the security element in order to determine that the second installation device is suitable for interaction with the first installation device to execute the installation job;
upon determining that the received installation job can be executed by the first installation device, process the installation job; and
upon determining that the installation job cannot be executed by the first installation device without interaction with the second installation device, interacting with the second installation device by relaying the installation job to the second installation device;

the second installation device configured to, when the relayed installation job is received from the first installation device:

process the installation job; or provide an authorization to the first authorization device for processing the installation job; and wherein the first installation device and the second installation device are trusted service manager devices and the second installation device is separate from the first installation device.

* * * * *